United States Patent [19]

Irwin et al.

[11] Patent Number: 4,647,994
[45] Date of Patent: Mar. 3, 1987

[54] MINIATURIZED CARTRIDGE-TYPE TAPE DRIVE FOR DATA PROCESSORS

[75] Inventors: Samuel N. Irwin; Francis Lum; Michael L. Bolt, all of Ann Arbor; Steven E. Henke, Westland; Edmund L. Sokolik, Warren; John M. Chambors, Canton, all of Mich.

[73] Assignee: Irwin Magnetic Systems, Inc., Ann Arbor, Mich.

[21] Appl. No.: 589,146

[22] Filed: Mar. 13, 1984

[51] Int. Cl.$^4$ .................. G11B 5/027; G11B 5/54; G11B 21/22; G11B 21/08
[52] U.S. Cl. ........................... 360/85; 360/105; 360/83; 360/106
[58] Field of Search ............... 360/105, 106, 107, 109, 360/85–86, 83, 97–99

[56] References Cited

U.S. PATENT DOCUMENTS

| | | | |
|---|---|---|---|
| 3,271,034 | 9/1966 | Andrews | 360/106 |
| 3,484,110 | 12/1969 | Takemi et al. | 360/106 |
| 3,485,959 | 12/1969 | Roys | 360/106 |
| 3,504,916 | 12/1967 | Ban | 360/106 |
| 3,521,009 | 7/1970 | Auld | 360/106 |
| 3,573,391 | 4/1971 | Harada | 360/106 |
| 3,592,068 | 7/1971 | Yamada | 360/106 |
| 3,740,493 | 6/1973 | Huber | 360/106 |
| 3,869,725 | 3/1975 | Dattilo | 360/106 |
| 4,040,106 | 8/1977 | Medley | 360/106 |
| 4,041,539 | 8/1977 | Robarge | 360/106 |
| 4,238,808 | 12/1980 | Tomita | 360/105 |
| 4,423,446 | 12/1983 | Takahashi et al. | 360/106 |

FOREIGN PATENT DOCUMENTS

| | | | |
|---|---|---|---|
| 46-31949 | 9/1971 | Japan | 360/109 |
| 54-109809 | 8/1979 | Japan | 360/106 |
| 56-114122 | 9/1981 | Japan | 360/106 |

Primary Examiner—John H. Wolff
Assistant Examiner—Alfonso Garcia
Attorney, Agent, or Firm—Price, Heneveld, Cooper, DeWitt & Litton

[57] ABSTRACT

A miniaturized tape cartridge drive for data processors in accordance with the invention has as peripherally-enclosing main frame providing an access opening for insertion to a tape cartridge and structurally mounting flat, pancake-type drive motors for tape transport and head-positioning translation laterally with respect to the tape, for accessing any of a plurality of adjacent recording tracks on the tape, such motors being disposed in tandem with respect to the cartridge-admitting opening and having their output shafts pointing in opposite directions. The head-positioning motor drives a directly-coupled rotary cam, and a positioning arm extends between the cam and the transducer head to move the head in response to movement of the cam. The positioning arm is pivotally journaled in opposite sides of the main frame upon a transverse pivot axis disposed medially of the arm, such that the arm operates as a fulcrumed lever.

25 Claims, 10 Drawing Figures

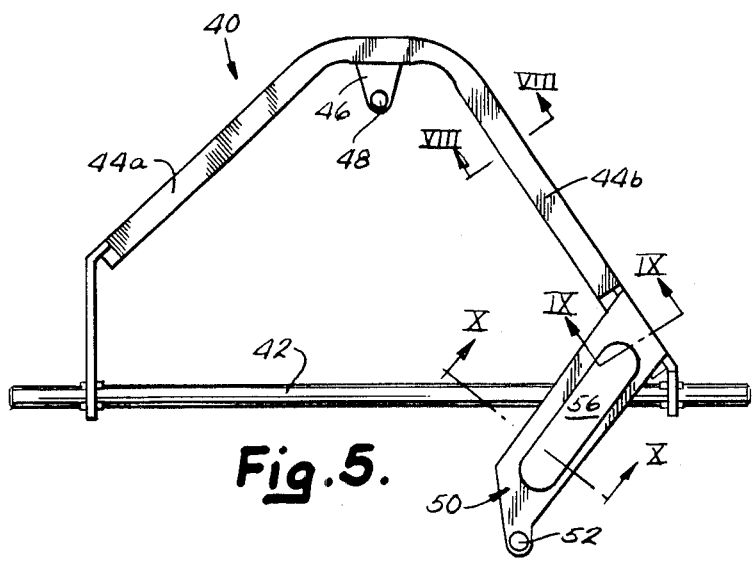
Fig. 5.
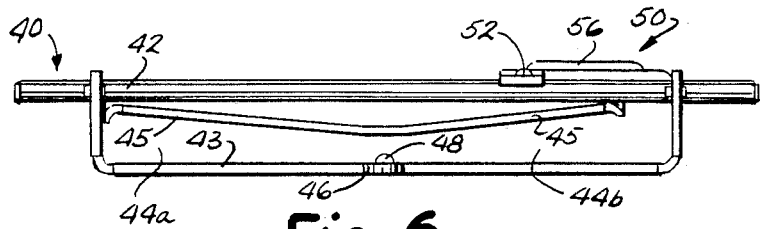
Fig. 6.
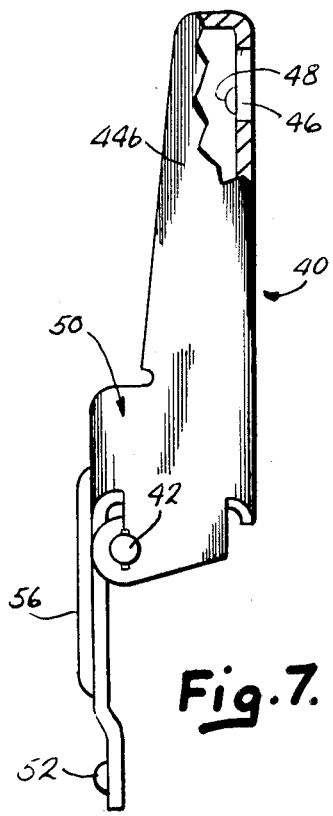
Fig. 7.
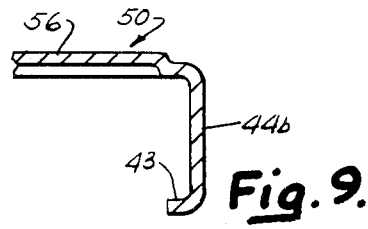
Fig. 9.
Fig. 10.
Fig. 8.

MINIATURIZED CARTRIDGE-TYPE TAPE DRIVE FOR DATA PROCESSORS

BACKGROUND OF THE INVENTION

In the past, many different types of magnetic tape data memories have been devised or proposed, and at an earlier point in time such devices constituted the most widely used long-term storage medium for large quantities of data. A very frequently-encountered form of such a tape memory, used with large main-frame computers, utilizes relatively wide tape (on the order of one-half inch) which is used with large, open reels, in a reel-to-reel configuration.

With the increasingly widespread development and use of smaller types of data processing and/or word processing equipment, involving "stand-alone" desktop processor devices comparable in physical size to the input terminals used in larger computer installations, there has been an increasing emphasis on the development of smaller forms of data storage devices. Thus, a significant advent in the development of "stand-alone" terminals (U.S. Pat. No. 3,760,375) utilized tape cassettes of the nature typically used in audio equipment, embodying eighth-inch tape. Following that, the "floppy" disc ("diskette") was developed and has now come into widespread usage, particularly in office-type or business computer applications. Also, many developments have taken place in "hard" disc drives and memory units to make them suitable for such use, e.g., development of "Winchester"-type drives.

In this increasing development, the two major underlying purposes are the need to obtain increased amounts of storage without corresponding increase in physical size, as well as the need to actually reduce the size of both the storage media and of the drive which utilizes the same. Thus, "floppy" disc media and drives have become available in sizes on the order of one-half that of the initial such devices, and the same is certainly true of "hard" disc drives, in which the media diameter has been reduced to approximately five and one-quarter inches (for "mini" disc drives) and to on the order of three and three-quarter inches (and indeed, in some instances, three inches) in more recent units (often known as "micro" disc drives).

Accordingly, there is an increasing need for analogous developments in tape storage media and drives, particularly for longer-term storage, inasmuch as high storage capacities may be achieved at relatively low cost by the use of tape media, and the use of tape as a storage media lends itself very admirably to "backup" or "archive" storage for the disc memories used as working or operating storage during entry or processing operations.

BRIEF SUMMARY OF THE INVENTION

The present invention provides a miniaturized tape drive in response to, and in satisfaction of, the aforementioned increasing need experienced in actual practice. Basically, apparatus in accordance with the invention may be implemented in either of two known size classifications; i.e., either the now-standard "mini-floppy" package having a five and one-quarter inch "half-high" form factor, or the "micron-mini" package having a three and one-half inch form factor. In either case, the unit is designed to be directly compatible with, and to use, the standard mini-floppy interface. The intended or most preferred form of tape media for use in the apparatus of the invention is the "mini-cartridge" which utilizes tape having a width of 0.150 inches, for example of the type known commercially as the "DC-100" and, in a cartridge containing a 185-foot length of similar tape, apparatus in accordance with the invention will readily provide storage in excess of ten megabites even in a formatted-type storage arrangement, i.e., on the order of from ten to twenty times the storage capacity typically encountered on one "mini-floppy" disc.

The foregoing advantages and characteristics are obtained through the use of multiple recording tracks on the tape (e.g., eight such tracks on the type of tape indicated, approximately equivalent to track density on the order of 60 tracks per inch), at recording densities on the order of 6,400 bits per inch. Substantially enhanced performance is preferably achieved through use of "embedded servo" information recorded on the tape media, with closed-loop servo positioning of the transducer (head) in order to accurately follow (i.e., track) along the centerline of each of the multiple recording tracks on the tape, and also to accurately reposition the head at any desired track on the tape, start/stop and random access operation thus being entirely within the capabilities of the unit.

Particular advantageous attributes of the apparatus in accordance with the invention include, in an overall package of exceedingly small physical size, highly reliable and yet completely flexible transducer head-positioning apparatus capable of shifting the head in small increments for accurate positioning and tracking operation and yet capable of accurate and rapid track-to-track or multiple-track head positioning operation. At the same time, highly accurate and consistent tape transport is made possible by the componentry utilized and the component-placement in the physical configuration employed. Additionally, novel and unusual head-positioning arm components and suspension provide for desirable consistency and reliability in positioning and tracking operations.

The foregoing major objectives and advantages of the invention together with a number of other favorable attributes thereof will become more apparent upon consideration of the ensuing specification, particularly when considered in light of the appended drawings, directed toward particular embodiments of the invention but also illustrative of the underlying concepts thereof.

BRIEF DESCRIPTION OF THE DRAWINGS

In the drawings:

FIG. 5 is an enlarged, overhead plan view of the head-positioning arm assembly utilized in the apparatus of the preceding Figures;

FIG. 6 is a front elevational view of the positioning arm assembly shown in FIG. 5;

FIG. 7 is a right side elevation of the apparatus shown in FIGS. 5 and 6;

FIG. 8 is a cross-sectional elevation taken through the plane VIII—VIII of FIG. 5;

FIG. 9 is a cross-sectional elevation taken through the plane IX—IX of FIG. 5; and FIG. 10 is a cross-sectional elevation taken through the plane X—X of FIG. 5.

DESCRIPTION OF THE PREFERRED EMBODIMENTS

Figure 1:
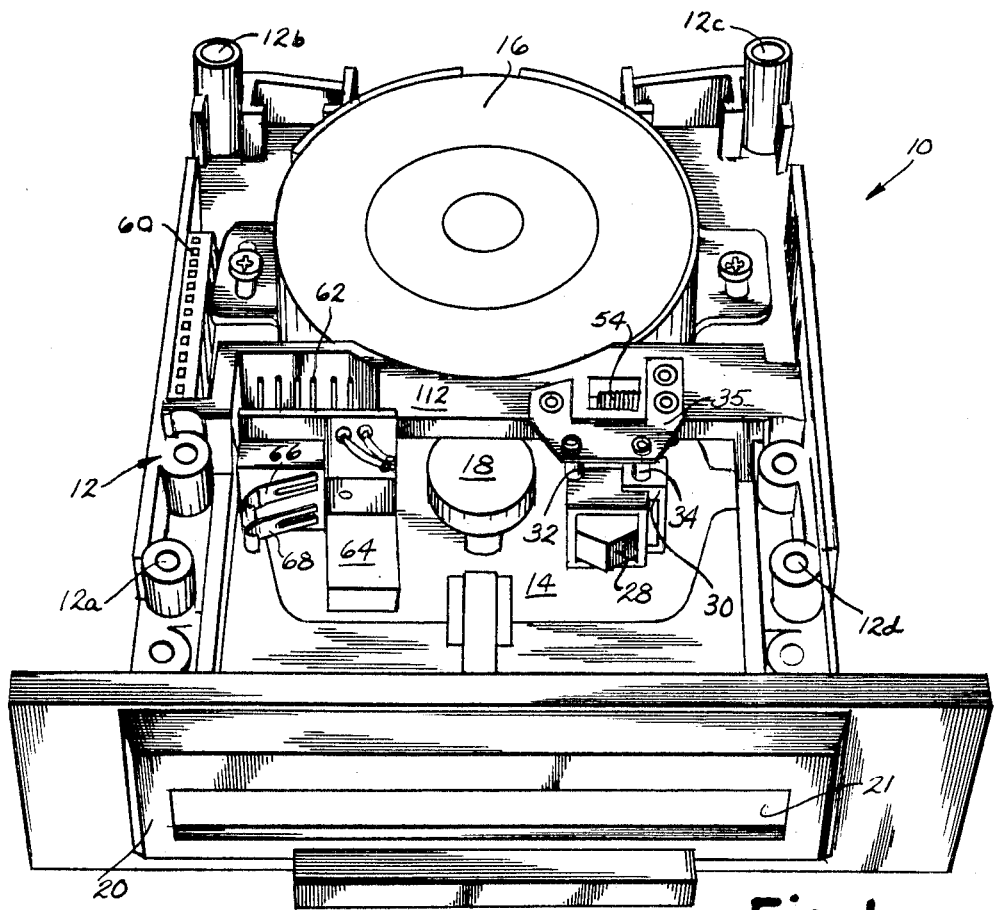
FIG. 1 is an overhead plan view of a tape drive in accordance with the invention, and the electronics circuitboard having been removed to show internal details.

Referring now in more detail to the drawings, the overall tape drive, designated by the numeral 10 (FIGS. 1 and 2) will be seen to comprise a generally rectangular main frame 12 which peripherally encloses, and on which is mounted, the various operating components of the drive, the largest of which are a tape-driving capstan motor 14 and a head-positioning stepper motor 16.

As illustrated, the capstan drive motor 14 is preferably located in the underside portion of the frame and generally centrally thereof, and mounted so that the tape-driving capstan 18, which is coupled directly to (or an integral part of) the output shaft of the drive motor 14, extends upwardly and is located in the upper portion of the frame, generally equidistant between the sides thereof and positioned directly behind the front face 20 of the drive, which defines a rectangular aperture 21 through which the tape cartridge is inserted i.e. aperture 21 comprises a tape cartridge admittance opening. As will be understood, the tape cartridge is a relatively narrow rectangular object, and when inserted into the drive it is disposed generally coplanar with respect to the main frame 12 and located such that the tape drive access opening in the cartridge lies contiguous to the capstan, so that the latter may engage the tape or tape-driving wheel, within the cartridge. Upon engagement, the capstan motor is caused to pivot near or about its center of mass. Such pivoting is opposed by a spring acting against the motor, thus insuring positive engagement of the motor capstan to the driven wheel within the cartridge. The pivoting of the motor about its center of mass greatly reduces vibration.

The head-positioning stepper motor 16 is mounted and positioned in a manner generally opposite that of the capstan-drive motor 14, i.e., the body of the stepper motor is disposed in the upper portion of the main frame, with the drive shaft extending downwardly into the bottom portion of the frame enclosure. Stepper motor 16 is used to rotate a head-positioning cam 22 (FIGS. 2 and 3) which is mounted directly on the motor output shaft and which is physically disposed in a position behind the capstan drive motor 14.

The head-positioning cam 22 is preferably a rotary, single-face cam having a central hub portion 24 which receives the drive shaft of the stepper motor 16, and which has a radially-projecting helically-shaped cam face 26 preferably having approximately 300° of rotational surface. In a particular preferred embodiment, stepper motor 16 provides 1.8° of output shaft rotation per step, and is driven in a "half-stepping" mode, so as to yield 0.9° of rotation each half-step. The rise of the cam face 26 is preferably such as to provide one-half mil (0.005 inches) of transducer head movement relative to the tape for each such half-step of the stepper motor. With such a configuration, the total excursion of allowable head movement is somewhat greater than the nominal total width of the tape (0.150 inches), providing for complete placement and positioning of the head at any point along the width of the tape, commencing from a position alongside the edge of the tape (i.e., not in registry with the tape).

Figure 4:
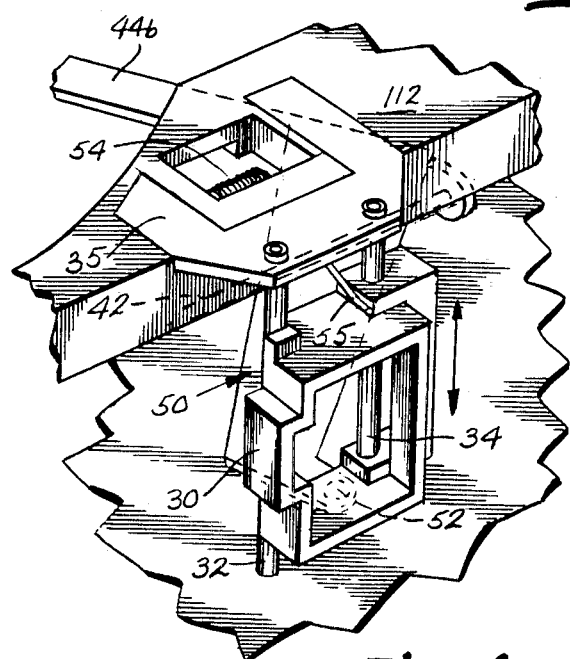
FIG. 4 is a fragmentary, perspective view showing a portion of the apparatus depicted in FIG. 1.

Referring to FIGS. 1, and 4, the transducer head 28 is fixedly mounted within a head-carrier or slide 30, and the latter is slidably mounted on a pair of cylindrical guide rods 32, 34 which pass through a set of complementary parallel passages in the head carrier. Preferably, the guide rods 32 and 34 depend from a retainer or mount 35 secured in place to a cross member 112 of the frame 12. With this arrangement, the head and its carrier remain in precisely-positioned orientation and location with respect to the tape path, immediately alongside the tape drive capstan 18; in this positional relationship, however, the head is shiftable across the width of the tape, as noted above.

Figure 2:
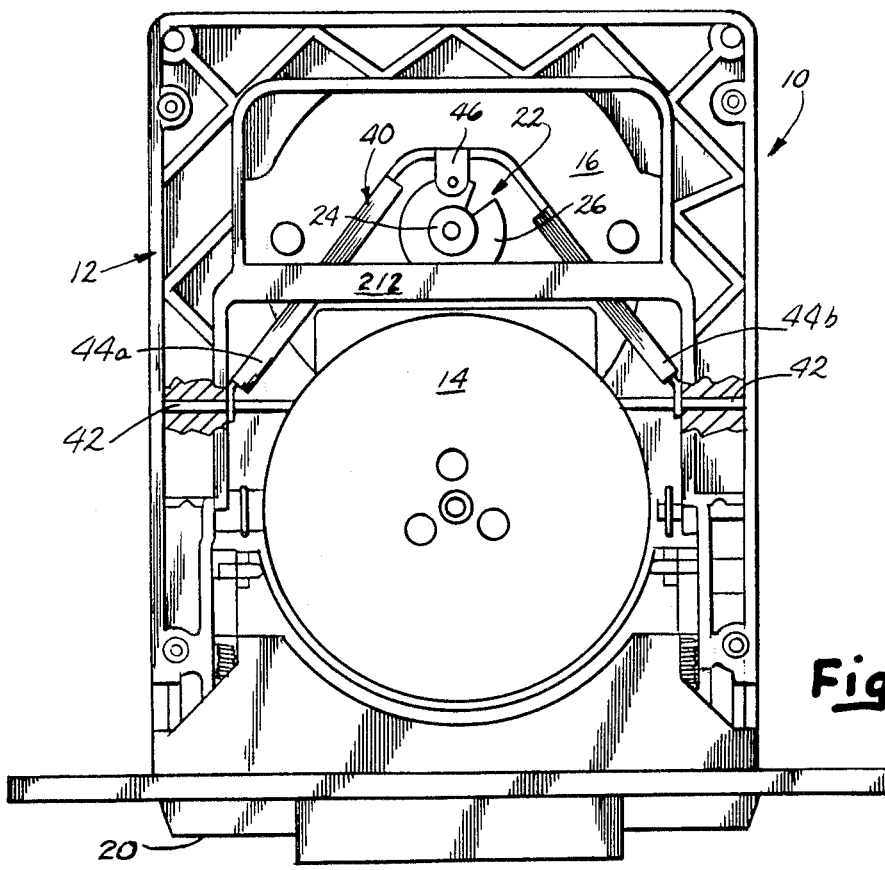
FIG. 2 is a bottom plan view of the apparatus shown in FIG. 1.
Figure 3:
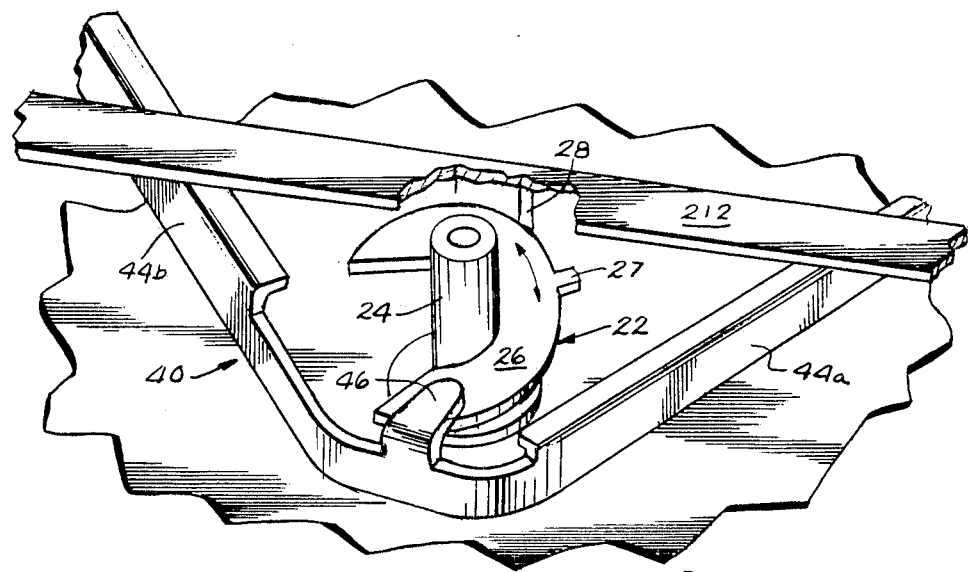
FIG. 3 is a fragmentary, rear perspective view showing a portion of the apparatus depicted in FIG. 2.

The head-positioning motion of the cam 22 is imparted to the head carrier 30 and head 28 through a pivotal control arm 40 shown in operative position in FIG. 2, with individual attributes being shown in FIGS. 2, 3, 5, 6, 7, 8, 9 and 10.

Referring more particularly to the Figures just noted, the control arm assembly 40 (which may also be referred to as a "transducer-moving or transducer-positioning linkage means, or arm) comprises, as a main component, a pivotal mounting shaft or axle 42 which is journaled in opposite sides of the main frame 12 at a point generally between the cam 22 and the head and head carrier 28, 30. Extending rearwardly from axle 42 is a generally V-shaped (or U-shaped) follower portion 44 having a particular cross-sectional configuration to be described more fully hereinafter and carrying a cam follower 46 disposed generally at the apex of the V-shaped configuration and comprising, in effect, a projecting tab extending toward the axle 42. At the end extremity of cam follower tab 46 is a rounded embossment or attached ball structure 48 which constitutes the element which actually contacts and slides along the inclined cam face 26 of cam 22. Cam contact 48 may actually be a rotatably-mounted ball bearing element if desired, but need not be a rotatable element if the cam face has at least moderately lubricious surface characteristics, as provided for example by polymeric materials such as acetal (which is preferred) or of the general nature of those materials sold under the marks "Nylon" or "Delrin". Such materials also provide for efficacious manufacture of the cam itself, through injection molding techniques.

Projecting forwardly from one side of the rear portion 44 of control arm 40 is a head-translating arm extension 50 (FIG. 5), having a rounded or spherically-shaped contact element 52 which may be essentially similar to the contact element 48 at the rear portion of the control arm assembly, noted above. The forwardmost portion of arm extension 50 projects under the transducer head carrier 30 (see FIGS. 3, 4 and 5), with the contact element 52 in contact with the underside of the head carrier 30 to raise the latter in accordance with downward movement imparted to the rear portion 44 of the control arm assembly 40 by the operation of cam 22 acting upon cam follower 46 through its contact member 48. Such upward head carrier motion is opposed, and returned, by an appropriate spring element 54 (FIGS. 1 and 4) disposed above the head carrier and mounted upon the frame cross member 112 so that a projecting end portion 55 of the spring bears downwardly against the top of the head carrier with sufficient force to overcome system friction and vibration, but with a small enough spring rate to avoid flexure of the arm.

As may be seen in FIGS. 5, 6, 7, 9 and 10, the forwardly-projecting arm extension 50 preferably carries an upwardly-concave embossment 56, which reinforces and strengthens the arm extension and thereby avoids flexure thereof in imparting motion to the head and head carrier in the manner noted just above. In this respect, it will be observed that arm extension 50 is preferably an integral portion of the arm structure 44, extending from side 44b thereof as a curved projection (FIGS. 5, 7 and 9). This further augments the structural integrity of the overall arm assembly, and helps to avoid such flexure during head-translating actions. Such ridigity or non-flexure of the overall arm assembly is an important factor in the accurate operation of the device, bearing in mind the fact as stated above that it is desirable to accurately control head translation in movements of a half mil. This performance is further enabled by providing the rear portion 44 of the control arm with a curved, somewhat channel-shaped cross section, particularly illustrated in FIG. 8. In this manner, the structure of the overall arm assembly is made to be as light in weight as possible to reduce its susceptibility to vibration, and yet as rigid in performance as possible, while at the same time enabling inexpensive manufacture of the arm by way of a multiple-step stamping operation, commencing with an appropriately-configured flat, narrow strip of sheet metal. To even further augment the structural rigidity and performance of this member, and to further accommodate the severe space limitation imposed by the desired package size, the rearwardly-extending portion 44 thereof progressively narrows as it proceeds toward the cam follower portion 46, thus lending a somewhat trapezoidal configuration to the two sections 44a and 44b (FIG. 6) and bringing their rolled or curved lower and upper edges 43 and 45, respectively, closer together in the vicinity of the cam follower projection 46.

Minimization of size and weight, without reduction in strength or performance, and indeed with maximized performance characteristics, will be seen to be carried throughout the design, configuration, and structural attributes of the apparatus in accordance herewith. The numerous attributes involved in the preferred embodiment of the control arm assembly 40 will be apparent from the preceding discussion thereof. Similar considerations will also be apparent upon considering the structural nature of the main frame 12, which as illustrated in FIGS. 1 and 2 is preferably a double-walled, cross-ribbed structure manufactured by injection molding of a tough, rigid polymeric material such as for example glass-filled polycarbonate. In this manner, the use of a metal casting is avoided without attendant loss of structural rigidity and dimensional stability, and with probable improvement in cost and/or weight characteristics.

Other aspects also contribute significantly to the small size and compactness of the unit, as well as to its reliability and freedom from error-contributing factors. For example, even things as fundamental as the initial choice of the tape drive motor and the head-positioning motor are very important since the physical size and placement of these elements have such an important bearing on the nature and performance of other necessary structural elements. At the same time, however, such basic factors as high standards of performance, long operational life, high reliability, low cost, and of course reliable and plentiful sources of supply, are also of great importance. In this regard, the head-positioning stepper motor 16, as illustrated physically in FIG. 1, is perhaps of surprising physical size in relation to the overall size of the tape drive itself, as a result of full consideration of the foregoing factors. To facilitate the very compact arrangement required by the extremely small physical size limitations imposed by the packaging requirements, as noted previously, both the drive motor 14 and the stepper motor 16 are preferably of "pancake" type, having a flat silhouette with substantially greater width (diameter) than thickness. The preferred stepper motor is a four-phase permanent magnet type which, in the size relation shown, will provide holding torque on the order of 400 grams per centimeter minimum. As previously indicated, the desired step angle is 1.8° per whole step (0.9° per half step), with 300° of allowable motor rotation, preferably limited by an appropriate stop 27 (FIG. 3) on the positioning cam 22, which is configured to come into abutting contact with one or the other side of a fixed stop 28 depending from a rear cross member 212 of the frame 12, one such position of abutment preventing movement beyond the cam position shown in FIG. 3 and the other position of abutment performing a like function at the other extremity of cam rotation.

As also illustrated in FIGS. 1 and 2, the tape-transport drive motor 14 is also of relatively large physical size for such a small drive unit. Preferably, this is also a relatively flat pancake-style servo motor, which may be of the type carrying stator coils on a printed circuit-board with commutation by Hall-Effect switching devices. Final drive speed, at the edge of the drive capstan 18, is such that it provides a tape speed on the order of 39 inches per second, for which a nominal motor output shaft speed on the order of about 1,300 rpm is desirable. This motor should be speed-controlled by closed-loop servo techniques, and thus the motor should employ or embody an integrated tach generator, which may desirably be optical (light-chopping) in nature.

As previously indicated, the cam 22 may simply be of the single-faced variety, with the cam face having a rise factor on the order of forty percent; thus, with 300° of allowable rotation, the overall length of transducer head movement provided by the cam will be on the order of 0.166 inches (thus, actually exceeding the total width of the intended tape). Also as previously indicated, both the cam and the tape drive capstan 18 are preferably direct-coupled to their respective motor output shafts, to further enhance precision control and eliminate error source.

The control arm 40 must, in the type of "architecture" or configuration illustrated, translate the rotational movement of the cam 22 from its location near the rear of the drive to the head carrier 30 and the head 28 mounted therein, which are located at a point relatively closer to the front of the drive, spaced inwardly from the front panel 20 thereof the extent necessary to permit full insertion of the intended tape cartridge, whose width thus corresponds generally to the spacing between the capstan and the front of the main frame.

To span this relatively substantial distance while precluding any significant torsion or bending effects, the control arm 40 must have particular attributes of stiffness and rigidity, while at the same time preferably being extremely lightweight. Thus, the arm configuration shown in FIGS. 5-10 inclusive, while unconventional, is very desirable. In this respect, significant attributes of the arm assembly 40 include its generally pivotal nature and the location of pivot points between the cam and the transducer head, together with the various rolled and stamped shape attributes providing for the desired degree of structural rigidity already noted above. In this respect, it will be noted that the portion of the control arm disposed rearwardly of the pivot axis employs a high degree of structural reinforcement (i.e., rolled curves, bends, etc.), while the forwardly-projecting extension arm 50 includes the long embossment 56.

Although the particular nature of the transducer head 28 may take a number of different forms, the head-positioning components which have been described provide for accurate, incremental control motion sufficient to position a single channel or magnetic gap at any desired position across the entire width of the tape, and preferably alongside as well, for edge-locating procedures. Such a head may employ a one channel, bi-directional read/write magnetic structure, which preferably is of a wide-write, narrow-read character which is described more fully in commonly-owned co-pending application Ser. No. 06/645,436. The effective track width recorded by the head should be on the order of about 0.016 inches, in order to obtain track densities on the order of about 60 tpi, as indicated above.

As will be understood, the overall operation of a tape drive in accordance herewith is intended to be under the overall control of a master controller constituting the user's primary processor, or operating as a function thereof. Notwithstanding this, a drive in accordance herewith is intended to include its own general operating electronics which, for purposes not particularly or directly involved in the present specification, desirably incorporates a microprocessor for such functions as servo-controlled track seek and centering utilizing embedded servo blocks recorded on the tape media, as well as a variety of other such functions. While the general attributes of such an operating system are well within the skill of the art, a more detailed description of a preferred type of control system is set forth in previously-filed and copending application Ser No. 06/280,138, now U.S. Pat. No. 4,472,750, issued Sept. 18, 1984 assigned to the assignee herein, the disclosure of which is to be deemed incorporated herein by reference. Preferably, the componentry which constitutes such an operating system is embodied in a PC board which may conveniently be secured atop the main frame, for example to internally-threaded stand-offs 12(a)-12(d), inclusive (FIG. 1), to in effect provide a closure therefor at the same time. Electrical connectors 60, 62 for making the necessary connections to such a circuitboard from the operative components of the drive may be nested within appropriate recesses defined by the frame 12, or otherwise secured with respect thereto. Also, the frame 12, as by its cross arm 112, may support an optical sensor block 64 for end-of-tape and beginning-of-tape sensing functions, as well as supporting cartridge-present and write-protect switches 66, 68.

It is to be understood that the above is merely a description of a preferred embodiment of the invention and that various changes, alterations and variations may be made without departing from the underlying concepts and broader aspects of the invention as set forth in the appended claims, which are to be interpreted in accordance with the established principles of patent law, including the doctrine of equivalents.

The embodiments of the invention in which an exclusive property or privilege is claimed are defined as follows.

We claim:

1. A miniaturized cartridge-type tape drive for data storage use in data-processing systems and having an overall size and shape on the same order as a half-high "mini-floppy" disc drive, said tape drive comprising in combination: a main support frame defining a tape cartridge admittance opening; a tape drive motor of generally flat silhouette having a height less than its width, said drive motor being mounted for support upon said frame in a location immediately behind said cartridge admittance opening; a tape-driving member coupled to the output shaft of said drive motor for rotation thereby and positioned in coplanar alignment with said cartridge admittance opening to transport the tape in said cartridge; a transducer-positioning motor of generally flat silhouette disposed rearwardly of said tape drive motor with respect to said cartridge-admittance opening and mounted for support upon said frame, said motor being of a type to produce generally continuous output motion in each of two opposite directions; cam means located directly adjacent to and directly coupled to said transducer-positioning motor to be driven bi-directionally thereby without lost motion, said cam means having a camming surface of generally continuous slope; transducer-moving linkage means extending lengthwise and forwardly of said frame from the rearward area of said cam and transducer-positioning motor to a forward location adjacent said tape-driving member, for coupling motion of said cam means camming surface to a transducer; and means for mounting and guiding said transducer adjacent said tape-driving member, for movably mounting a transducer at such location and guiding the movement of such transducer transversely across the path of said tape at said tape-driving member; said transducer-moving linkage means being operatively coupled to said transducer to impart generally continuous bi-directional guided movement thereto of a type suitable for following a recorded track on the tape by servo control.

2. A miniaturized tape drive in accordance with claim 1, wherein said tape-driving member is directly coupled to the output shaft of said tape drive motor.

3. A miniaturized tape drive in accordance with claim 2, wherein said tape-driving member comprises a capstan.

4. A miniaturized tape drive in accordance with claim 2, wherein said cam means is directly coupled to the output shaft of said transducer-positioning motor.

5. A miniaturized tape drive in accordance with claim 4, wherein said cam means comprises a rotary cam member.

6. A miniaturized tape drive in accordance with claim 1, wherein said transducer-moving linkage includes a pivotally-mounted arm apparatus.

7. A miniaturized tape drive in accordance with claim 6, wherein said arm apparatus includes a pivot suspension mounting disposed generally between said cam means and said transducer-mounting and guiding means.

8. A miniaturized tape drive in accordance with claim 7, wherein said pivot suspension mounting comprises a pair of oppositely-disposed and mutually-spaced pivot shaft extremities, and wherein said main frame carries a pair of spaced journals each disposed along an opposite side of the frame, said journals rotatably receiving said spaced pivot shaft extremities to thereby pivotally support said arm apparatus.

9. A miniaturized tape drive in accordance with claim 8, wherein said arm apparatus includes arm portions extending rearwardly with respect to said cartridge-admittance opening and from the general location of said rotatably-journaled pivot shaft extremities, said arm portions extending convergently toward one another and being interconnected in the area of said cam means.

10. A miniaturized tape drive in accordance with claim 9, wherein said arm portions form a generally V-shaped structure and said cam means is located near the base of such structure.

11. A miniaturized tape drive in accordance with claim 10, and including a cam-follower element joined to said V-shaped arm structure near said cam means, said element being operatively coupled to said cam means to follow the motion of said camming surface.

12. A miniaturized tape drive in accordance with claim 7, wherein said arm apparatus includes a projecting portion operatively coupled to said transducer-mounting and -guiding means.

13. A miniaturized tape drive in accordance with claim 12, and including means for maintaining said projecting portion in operative contact with said transducer-mounting and -guiding means.

14. A miniaturized tape drive in accordance with claim 13, wherein said projecting portion has a generally pivotal coupling with said transducer-mounting and -guiding means.

15. A miniaturized tape drive in accordance with claim 13, including means for maintaining operative contact between said projecting portion and said transducer-mounting and -guiding means, said contact-maintaining means comprising a resilient biasing member urging said projecting portion and said mounting and guiding means toward one another.

16. A miniaturized tape drive in accordance with claim 15, wherein said resilient biasing member urges said cam follower element into operative contact with said camming surface of said cam means.

17. A miniaturized tape drive in accordance with claim 16, wherein said arm apparatus comprises a member formed from sheet-form material and having a plurality of integral longitudinally extending portions which are angularly-disposed relative to one another, for augmenting beam strength and reducing flexure of the arm apparatus during transducer-moving operation.

18. A transducer-moving arm apparatus for use in a data memory having a movable transducer for accessing different recording tracks on a recording media and a cam means for moving said transducer through interconnection therewith by said arm apparatus, said arm apparatus comprising: pivot axle means defining a pivot axis; a first arm portion extending in a first direction away from said pivot axis, and a second arm portion extending in a second direction away from said pivot axis; cam-follower means coupled to said first arm portion at a distance spaced from said pivot axis; means for coupling said second arm portion to said transducer to move the same in response to movement of the first and second arm portions; at least one of said first and second arm portions including a section of thin sheet-like stock having integral angularly-offset extremities for reinforcing such portion and substantially eliminating flexure in the direction of transducer movement otherwise resulting from the forces generated by the operation of said cam means in moving said transducer.

19. A transducer-moving arm apparatus as defined in claim 18, wherein both said first and second arm portions include sections of thin sheet-like stock having angularly-offset extremities for reinforcing such portion and substantially eliminating flexure in the direction of transducer movement.

20. A transducer-moving arm apparatus as defined in claim 18, wherein said first arm portion defines a generally V-shaped structure with the apex of the V-shape located a distance away from said pivot axis.

21. A transducer-moving arm apparatus as defined in claim 20, wherein said axle means defining said pivot axis comprises an elongated member disposed coplanar with and interconnecting the spaced legs of said V-shaped structure.

22. A transducer-moving arm apparatus for use in a data memory having a movable transducer for accessing different recording tracks on a recording media and a cam means for moving said transducer through interconnection therewith by said arm apparatus, said arm apparatus comprising means defining a pivot axis; a first arm portion extending in a first direction away from said pivot axis, and a second arm portion extending in a second direction away from said pivot axis; cam-follower means coupled to said first arm portion at a distance away from said pivot axis; means for coupling said second arm portion to said transducer to move the same in response to movement of the first and second arm portions; said first arm portion defining a generally V-shaped structure with the apex of the V-shape away from said pivot axis; and said cam-follower means being coupled to said first arm portion in the area of said apex.

23. A transducer-moving arm apparatus as defined in claim 22, wherein said axle means defining said pivot axis comprises an elongated member interconnecting the legs of said V-shaped structure.

24. A transducer-moving arm apparatus as defined in claim 23, wherein both said first and second arm portions include sections of thin sheet-like stock having angularly-offset extremities for reinforcing such portion and substantially eliminating flexure in the direction of transducer movement.

25. A miniaturized cartridge-type tape drive for data storage use in data-processing systems and having an overall size and shape on the same order as a half-high "mini-floppy" disc drive, said tape drive comprising in combination: means defining at least portions of the outer periphery of said tape drive and a tape cartridge admittance opening extending through such periphery; a tape drive motor of generally flat silhouette having a height less than its width, said drive motor being mounted in a location immediately adjacent said cartridge admittance opening and inside said periphery; a tape drive member direct-coupled to the output of said drive motor for rotation thereby and positioned in coplanar alignment with said cartridge admittance opening, to impart transport motion to the tape in said cartridge; a transducer-positioning motor of generally flat silhouette disposed further inwardly of said periphery and admittance opening with respect to said tape drive motor, said motor being disposed in an inverted position with respect to said tape drive motor and interfitting therewith in partially-overlapped relation; cam means located directly adjacent to and directly coupled to said transducer-positioning motor to be driven thereby without lost motion, said cam means having a camming surface of generally continuous slope; lever-type transducer-moving linkage means extending lengthwise and forwardly from the rearward area inside said periphery adjacent said cam and transducer-positioning motor to a forward location adjacent said tape-driving member, for coupling motion of said camming surface to a transducer; and means for mounting and guiding said transducer adjacent said tape-driving member and generally in alignment with said tape cartridge admittance opening, for movably mounting a transducer at such location and guiding the movement of such transducer transversely across the path of tape contained within a cartridge admitted through such opening and moved by a said tape-driving member; said transducer-moving linkage means having pivotal mounting means located generally medially thereof and arranged to provide oppositely-directed motion of the end portions of said linkage in response to movement of said cam means and camming surface.

* * * * *

REEXAMINATION CERTIFICATE (955th)
United States Patent [19]
Irwin et al.

[11] B1 4,647,994
[45] Certificate Issued  Nov. 29, 1988

[54] MINIATURIZED CARTRIDGE-TYPE TAPE DRIVE FOR DATA PROCESSORS

[75] Inventors: Samuel N. Irwin; Francis Lum; Michael L. Bolt, all of Ann Arbor; Steven E. Henke, Westland; Edmund L. Sokolik, Warren; John M. Chambers, Canton, all of Mich.

[73] Assignee: Irwin Magnetic Systems, Inc., Ann Arbor, Mich.

Reexamination Request:
No. 90/001,369, Nov. 2, 1987

Reexamination Certificate for:
Patent No.: 4,647,994
Issued: Mar. 3, 1987
Appl. No.: 589,146
Filed: Mar. 13, 1984

[51] Int. Cl.⁴ .......... G11B 5/027; G11B 5/54; G11B 21/22; G11B 21/08
[52] U.S. Cl. .......... 360/85; 360/83; 360/105; 360/106
[58] Field of Search .......... 360/105-109, 360/85-86

[56] References Cited

U.S. PATENT DOCUMENTS

| | | | |
|---|---|---|---|
| 3,485,959 | 12/1969 | Roys | 360/106 |
| 3,521,009 | 7/1970 | Auld | 360/106 X |
| 3,575,422 | 4/1971 | Peltz | |
| 3,583,708 | 6/1971 | Prager | |
| 3,715,523 | 2/1973 | Rousseau | |
| 4,024,582 | 5/1977 | Ban | 360/106 |
| 4,050,089 | 9/1977 | Okamoto | 360/106 |
| 4,056,518 | 11/1977 | Milovac | 360/106 |
| 4,144,549 | 3/1979 | Burdorf | 360/78 |
| 4,275,427 | 6/1981 | Bjordahl | 360/106 |
| 4,468,712 | 8/1984 | Mueller | 360/106 |
| 4,514,775 | 4/1985 | Manning | 360/106 X |

FOREIGN PATENT DOCUMENTS

| | | |
|---|---|---|
| 2353923 | 5/1977 | France |
| 2355354 | 6/1977 | France |
| 1127207 | 9/1968 | United Kingdom |

OTHER PUBLICATIONS

IBM TDB, vol. 25, No. 10, 3-83, pp. 4968-4969; T. R. Fournier; "Cam-Controlled Head Load/Unload".
Standard Handbook for Mechanical Engineers; T. Baumeister; 8th Edition, McGraw Hill Book Co; pp. 5-15 thru 5-54.
Mini-Micro Systems Mag., Jul. 1981, p. 17; "Backup for 5¼ in. Wincester Als. Planned".

Primary Examiner—A. J. Heinz

[57] ABSTRACT

A miniaturized tape cartridge drive for data processors in accordance with the invention has as peripherally-enclosing main frame providing an access opening for insertion to a tape cartridge and structurally mounting flat, pancake-type drive motors for tape transport and head-positioning translation laterally with respect to the tape, for accessing any of a plurality of adjacent recording tracks on the tape, such motors being disposed in tandem with respect to the cartridge-admitting opening and having their output shafts pointing in opposite directions. The head-positioning motor drives a directly-coupled rotary cam, and a positioning arm extends between the cam and the transducer head to move the head in response to movement of the cam. The positioning arm is pivotally journaled in opposite sides of the main frame upon a transverse pivot axis disposed medially of the arm, such that the arm operates as a fulcrumed lever.

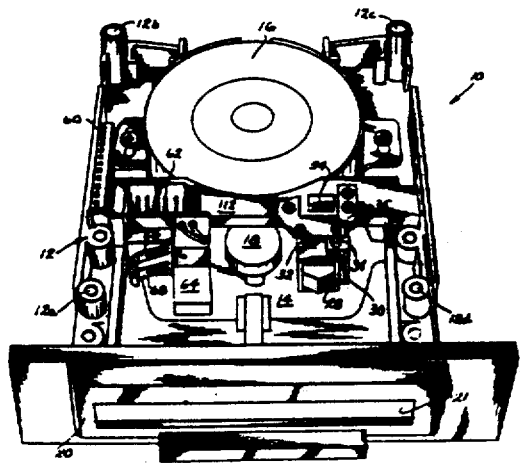

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-25 is confirmed.

* * * * *